(12) United States Patent
Eklund

(10) Patent No.: US 6,313,876 B1
(45) Date of Patent: Nov. 6, 2001

(54) SENSOR ELEMENT ARRAY FOR READING AND PROCESSING IMAGE INFORMATION

(75) Inventor: Jan-Erik Eklund, Linkoping (SE)

(73) Assignee: IVP Integrated Vision Products AB Teknikringen, Linkoping (SE)

(*) Notice: Subject to any disclaimer, the term of this patent is extended or adjusted under 35 U.S.C. 154(b) by 0 days.

(21) Appl. No.: 08/973,726

(22) PCT Filed: Jun. 3, 1996

(86) PCT No.: PCT/SE96/00728

§ 371 Date: Mar. 6, 1998

§ 102(e) Date: Mar. 6, 1998

(87) PCT Pub. No.: WO96/41464

PCT Pub. Date: Dec. 19, 1996

(30) Foreign Application Priority Data

Jun. 7, 1995 (SE) ................................... 9502063

(51) Int. Cl.[7] ................................... H04N 5/335
(52) U.S. Cl. .......................... 348/308; 348/241
(58) Field of Search .................. 348/241, 242, 348/243, 248, 249, 294, 302, 303, 308; 257/435; H04N 5/217

(56) References Cited

U.S. PATENT DOCUMENTS

| 4,400,087 | 8/1983 | Nakayama . |
| 4,683,580 | 7/1987 | Matsunaga . |
| 4,875,098 | 10/1989 | Yamamoto . |
| 5,086,344 | 2/1992 | D'Luna et al. . |
| 5,268,764 | 12/1993 | Kihara et al. . |
| 5,307,145 | 4/1994 | Schenkel et al. . |
| 5,576,763 | * 11/1996 | Ackland et al. ............... 348/308 |
| 5,631,704 | * 5/1997 | Dickinson et al. ............ 348/308 |
| 5,633,679 | * 5/1997 | Gowda et al. ................. 348/243 |
| 5,835,141 | * 11/1998 | Ackland et al. ............... 348/308 |
| 6,115,066 | * 9/2000 | Gowda et al. ................. 348/308 |

FOREIGN PATENT DOCUMENTS 0 022 524  1/1981 (EP) .

OTHER PUBLICATIONS

Copy of PCT Application No. PCT/GB93/01356 filed Jun. 29, 1993.
Abstract of SE 8401912–4 for Sweden published Nov. 11, 1985.
IEEE, "Standard CMOS Active Pixel Imae Sensors for Multimedia Applications", 1995, pp. 215–224.

* cited by examiner

Primary Examiner—Tuan Ho
(74) Attorney, Agent, or Firm—Merchant & Gould P.C.

(57) ABSTRACT

The present invention relates to a device for the input and processing of information comprising sensor elements arranged in matrix form, which are integrally formed on a substrate. Each sensor element comprises output electronics (3) and at least one photovoltaic cell (PD), which is adapted to convert an optical signal incident upon the photovoltaic cell to an electrical signal. The device according to the invention is characterized in that each sensor element is adapted to perform compensation of an offset error in the output electronics (3) forming part of the sensor element and that each sensor element is adapted to perform the said offset compensation independently of the other sensor elements in the device.

2 Claims, 3 Drawing Sheets

SENSOR ELEMENT ARRAY FOR READING AND PROCESSING IMAGE INFORMATION

TECHNICAL SCOPE

The present invention relates to a device for the input and processing image information comprising sensor elements arranged in matrix form which are integrally formed on a substrate. Each sensor element comprises output electronics and a photovoltaic cell, which is adapted to convert an optical signal, incident upon the photovoltaic cell, into an electrical signal.

PRIOR ART

Two-dimensional image sensors, which take the form of integrated circuits, are used in image processing. Each two-dimensional image sensor comprises a number of sensor elements, for example 256×256 sensor elements, which must take up little surface area in order to facilitate design as an integrated circuit. Each sensor element comprises a detector part which converts an optical signal to an electrical signal suitable for further processing. In order to obtain a compact image sensor, it is important that the detector part take up as little space as possible, whilst at the same time it must naturally produce a reliable result.

A device for compensation of the image elements in a CCD camera, in which a CCD sensor delivers unamplified and uncompensated image element values to a common serial output, where amplification and compensation are performed centrally, is already known from U.S. Pat. No. 4,875,098. In certain applications, however, there may be a need for compensation and parallel output of the image in all image points, which problem is not solved by the said device.

A device which combines photovoltaic cell with output electronics in each sensor element is already known from the conference paper "Standard CMOS Active Pixel Image Sensors for Multimedia Applications" by A. Dickinson, B. Ackland, El-Sayed Eid, D. Inglis, and E. Fossum, which was presented at the "16th Conference in Advanced Research in VLSI" at Chapel Hill, N.C., on March 27–29. A disadvantage to this known device is that variations in the constituent electrical components give rise to so-called offset errors, which manifest themselves as a fixed pattern in the output image. The said offset errors are counteracted in columnar compensation electronics, which means that the image must be moved from the sensor element before offset compensation can be performed. In certain applications, for example where there is processor capacity in the sensor element, this transfer constitutes a disadvantage.

DESCRIPTION OF THE INVENTION

The object of the present invention is to provide a device for the input and processing of image information, which reduces the occurrence of disturbances due to offset in an output image.

This object is achieved by a device according to the invention, which comprises sensor elements arranged in matrix form. Each sensor element in the device according to the invention is adapted so that compensation of an offset error in the output electronics forming part of the sensor element is performed in the sensor element. The said offset compensation is performed in each sensor element independently of other sensor elements in the device, in case different control signals are used for the various sensor elements.

With the design of sensor element according to the invention the offset compensation can be performed locally in the sensor elements using a relatively small number of components.

PREFERRED EMBODIMENTS

The invention relates to offset compensation in a sensor element which forms part of a set of sensor elements arranged in matrix form. All the sensor elements are integrally formed on a substrate and each comprise a photovoltaic cell and output electronics, for example an amplifier or comparator. Because of offset in the output electronics in each sensor element and variations between the offset error in different output electronics, each sensor element is adapted for local offset compensation in the sensor element. Offset compensation in one sensor element can be performed independently of offset compensation in other sensor elements in the arrangement, in case different control signals are used for each sensor element. The compensation is based on correlated double sampling. Sampling of a known compensation value is first performed during a first compensation stage, and then sampling of an unknown value during an image information input stage. In the examples of sensor elements shown in FIGS. 1 to 6 a known value is sampled with the reset switch and the unknown value when the value of the output electronics is outputted. Both these values contain constant errors, here known as offset. By subtracting the known and unknown value, the constant errors can be eliminated.

The invention will now be further explained with reference to the figures which show a number of preferred embodiments of a sensor element according to the invention.

Figure 1:
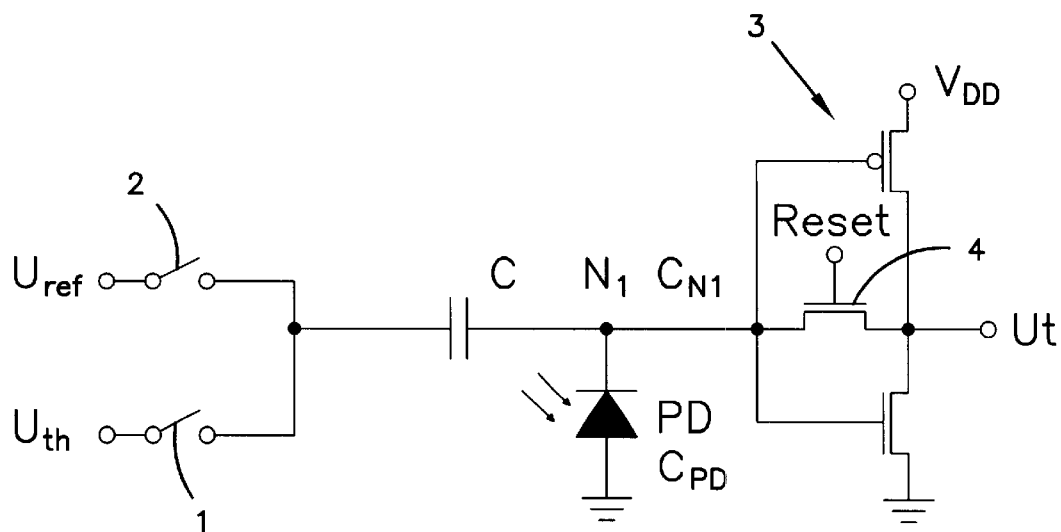
FIG. 1 shows a first embodiment of a sensor element according to the invention.

The sensor element shown in FIG. 1 has two inputs, the first of which connects a compensating voltage $U_{th}$ to a capacitor C by way of a first change-over switch 1 and the second of which connects a reference voltage $U_{ref}$ to the same capacitor C by way of a second change-over switch 2. The sensor element further comprises a photodiode PD, the cathode of which is connected to a known reference level, for example earth. The anode of the photodiode is connected to the output electronics and to the said capacitor C at a node $N_1$. In the case shown in FIG. 1, the output electronics consist of a comparator 3 comprising two cascade-connected field effect transistors FET and a reset switch 4 in the form of a field effect transistor FET.

With the possible connection to two different voltage levels shown in the figure, a compensation of an offset error in the comparator can be achieved in the sensor element. In a first compensation stage the said reset switch 4 is closed and the compensating voltage $U_{th}$ connected. The charge in the node $N_1$ is determined by the offset of the comparator 3.

Once the capacitor C has been charged with the compensating voltage, the image information can be picked up by the sensor element. Before input of the image information commences, the compensating voltage $U_{th}$ is disconnected and the reference voltage $U_{ref}$ connected. The charge in node $N_1$ is varied in proportion to the difference between the reference voltage $U_{ref}$ and the compensating voltage $U_{th}$, which difference can be precisely determined through the choice of the said reference voltage and compensating voltage. When the photodiode is illuminated, this is discharged in proportion to the luminous intensity. The discharge time of the capacitor C depends on the current through the capacitor and once compensation has been performed will depend solely on the precision of the capacitor C and the photodiode PD. Since the capacitor C constitutes a passive element, the variations between capacitors in different sensor elements can be minimised.

Figure 2:
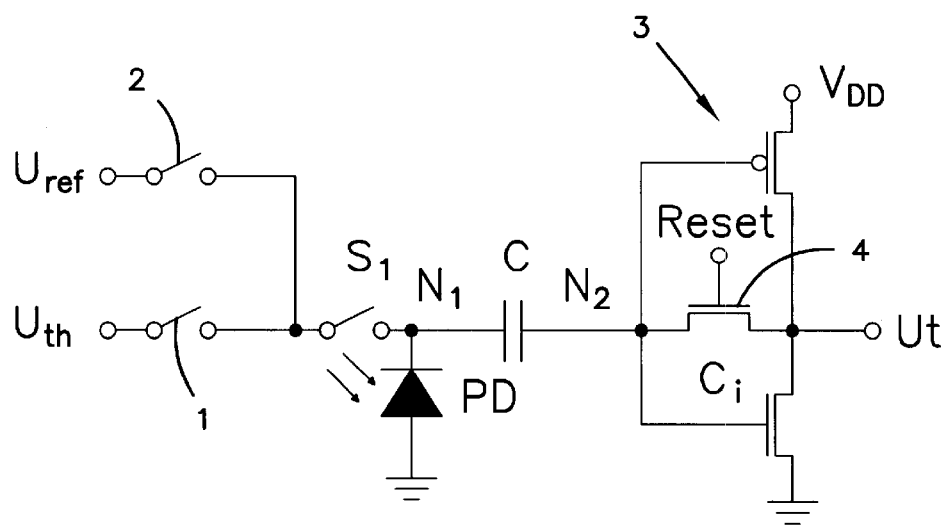
FIG. 2 shows a second embodiment of a sensor element according to the invention.

FIG. 2 shows a second embodiment of a sensor element according to the invention. This sensor element differs from the sensor element shown in FIG. 1 in that a compensating voltage $U_{th}$ and a reference voltage $U_{ref}$ are directly connected to the photovoltaic cell PD by way of a switch $S_1$. The said photovoltaic cell is capacitively connected by way of a capacitor C to the output electronics, which in this case consist of a comparator 3 with a reset switch 4.

In a first-compensation stage the compensating voltage $U_{th}$ is connected, thereby setting a starting condition for charging in node $N_2$. The compensating voltage $U_{th}$ is connected by the closing of a first change-over switch 1. After the node $N_2$ has obtained a starting condition dependent on the compensating voltage, image information can be picked up by the sensor element. Before input of the image information commences, the change-over switch 1 is opened so that the compensating voltage $U_{th}$ is disconnected. The reference voltage $U_{ref}$ is connected by closing of the change-over switch 2 and closing of the switch $S_1$ for a brief interval. The voltage in $N_1$ is changed from the compensating voltage $U_{th}$ to the reference voltage $U_{ref}$. The said voltage change is transmitted by the capacitor C to $N_2$. When the switch $S_1$ is opened, the charge in node $N_1$ is discharged by the photocurrent through the photodiode. The comparator 3 switches over when the voltage in $N_1$ has returned to the compensating voltage $U_{th}$. The discharge time is influenced solely by the photodiode PD.

Figure 3:
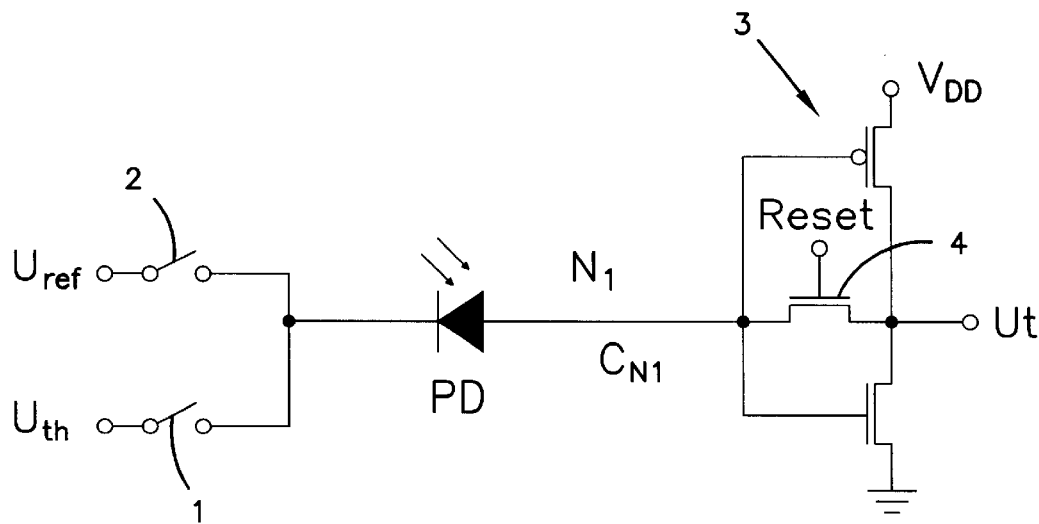
FIG. 3 shows a third embodiment of a sensor element according to the invention.

FIG. 3 shows a third embodiment of a sensor element according to the invention. The sensor element shown comprises a comparator 3 with a reset switch 4 and a photodiode PD. In this embodiment use is made of the capacitive characteristics of the photodiode, which makes it possible to eliminate the capacitor C shown in FIG. 1. In the same way as in the embodiment shown in FIG. 1, two different voltage levels are used in order to bring about the desired elimination of offset errors in the comparator 3. In a first compensation stage the reset switch 4 is closed and the compensating voltage $U_{th}$ is connected. The charge in node $N_1$ is determined by the offset of the comparator. When the desired charge is attained in node $N_1$, the compensating voltage $U_{th}$ is disconnected and the reference voltage $U_{ref}$ connected. The reset switch 4 is opened and it is possible to input the image information. The charge in node $N_1$ is corrected by $\Delta Q=(U_{ref}-U_{th})C_{PD}$ as in the embodiment shown in FIG. 1 The discharge which is produced by illumination of the photodiode in this case therefore depends solely on the precision of the photodiode. By using the capacitive characteristics of the photodiode, the capacitor C (according to FIG. 1) can be eliminated, which may be of value from the point of view of space-saving. The method of offset compensation shown does not, however, give such complete offset compensation as in the embodiment shown in FIG. 1, owing to the fact that the capacitance in the photodiode is not independent of the voltage over the diode.

Figure 4:
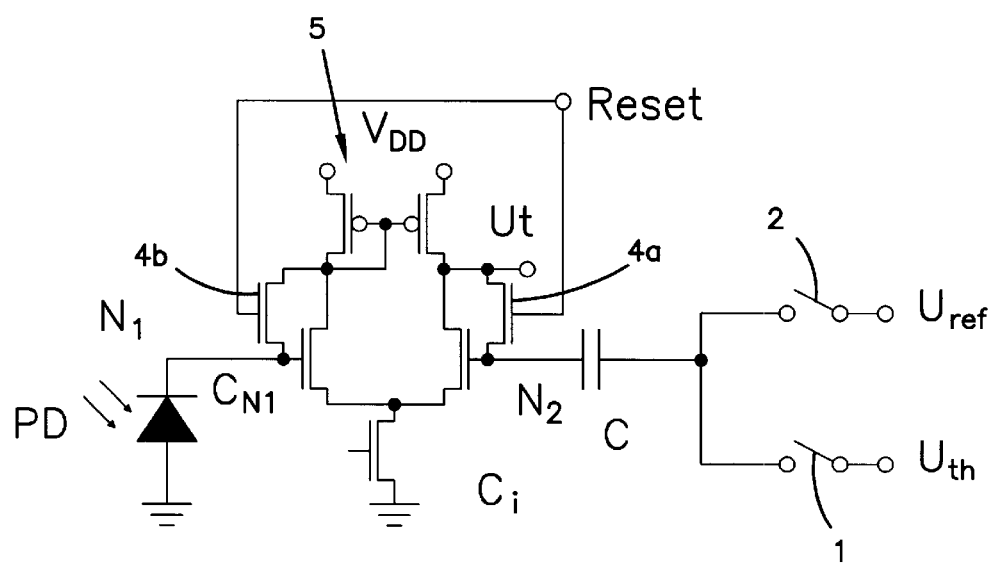
FIG. 4 shows a fourth embodiment of a sensor element according to the invention.

FIG. 4 shows a fourth embodiment of a sensor element which permits compensation of offset. The sensor element shown comprises a comparator 5 with a reset switch 4a, 4b, a capacitor C and a photodiode PD. The comparator differs somewhat from the comparator 3, described earlier in connection with FIGS. 1 to 3, but the problem with offset error exists even for this type of comparator. In a first compensation stage in the sensor element, the reset switch 4a, 4b is closed and the compensating voltage $U_{th}$ is connected. The charge in the nodes $N_1$ and $N_2$ are determined by the switch-over point of the comparator 5. The compensating voltage $U_{th}$ is then disconnected and the reference voltage $U_{ref}$ is connected. The reset switch is opened and it is possible to input the image information. The charge in node $N_2$ is corrected by $(U_{ref}-U_{th})C$. For the condition of the comparator to be changed an equally large change must occur on the comparator's second input in node $N_1$. This change is controlled by the current through the photodiode PD and, owing to the compensation shown, is not affected by any offset error in the comparator 5.

Figure 5:
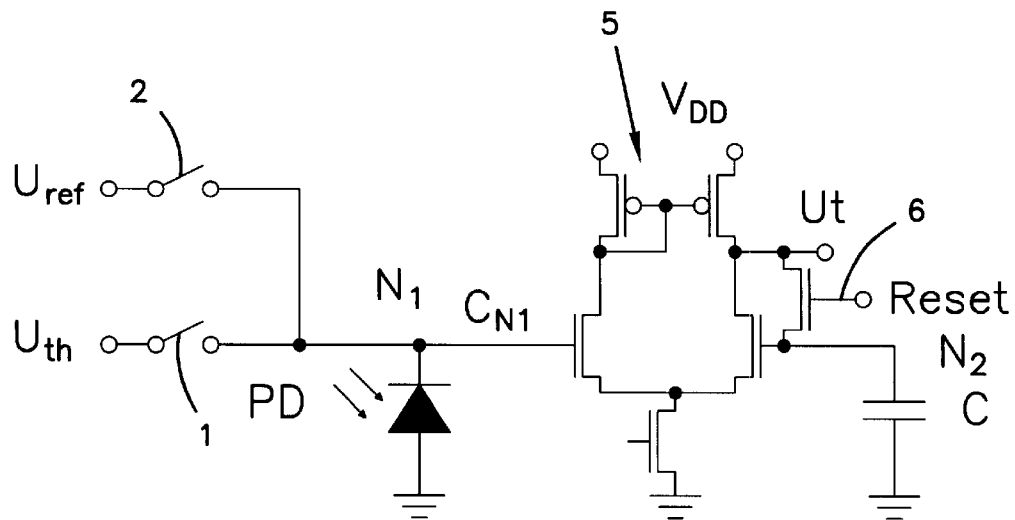
FIG. 5 shows a fifth embodiment of a sensor element according to the invention.

FIG. 5 shows a further embodiment of a sensor element with local compensation of offset. In the sensor element shown a type of comparator 5 is used which is similar to the embodiment shown in FIG. 4. In addition to the comparator 5, the sensor element comprises a reset switch 6, a capacitor C and a photodiode PD. A first compensation stage is performed in the sensor element, as described for previous embodiments, by the connection of a compensating voltage $U_{th}$. In an input stage the reset switch 6 is opened and the reference voltage $U_{ref}$ is connected for a brief interval. At that moment the charge in node $N_1$ is corrected by $(U_{ref}-U_{th})C_{N1}$ where $CN_1$ is the total capacitance in node $N_1$, which is essentially dependent on the capacitance of the photodiode PD. The discharge time in this case depends on the precision of the photodiode.

Figure 6:
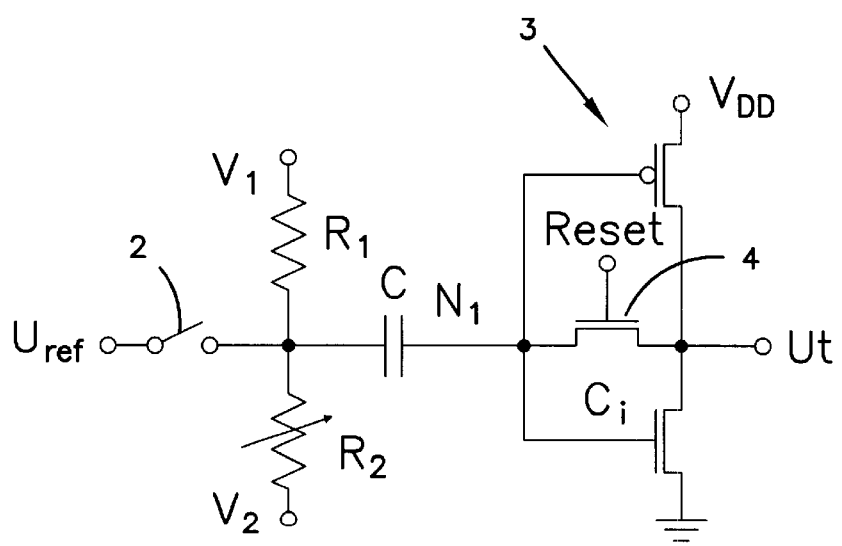
FIG. 6 shows a sixth embodiment of a sensor element according to the invention.

Finally, in the sensor element shown in FIG. 6 a photoresistor $R_2$ is used for converting optical information to an electrical signal. In a compensation stage a reset switch 2 is closed and a reference voltage $U_{ref}$ is connected. The charge in node $N_1$ is determined by the comparator's switch-over point, that is its offset. In an image information input stage the reset switch is opened and $U_{ref}$ is disconnected. The charge in node $N_1$ is corrected as a function of the voltage division between the resistors $R_1$ and $R_2$. The comparator switches over as a function of the polarity of the charge.

The embodiments described above represent some examples of sensor elements with local compensation of offset. The invention, however, is not limited to these embodiments described, other sensor elements with local offset compensation also being possible within the scope of the idea of the invention.

What is claimed is:

1. Device for the input and processing of image information, said device comprising:
    a substrate;
    a plurality of sensor elements integrally arranged on said substrate in matrix form, each of said sensor elements comprising output electronics adapted to output an electronic signal and at least one photovoltaic cell adapted to convert an optical signal incident thereupon into an electrical signal, wherein
    each of said sensor elements is adapted to perform a compensation so as to substantially eliminate an offset error of said sensor, said compensation being performed in said output electronics, each of said sensor elements is adapted to perform said compensation independently from other sensor elements in said device, and each of said sensor elements is adapted to perform correlated double sampling of one known and one unknown value.

2. Device for the input and processing of image information, said device comprising:

a substrate;

a plurality of sensor elements integrally arranged on said substrate in matrix form, each of said sensor elements comprising output electronics adapted to output an electronic signal and at least one photovoltaic cell adapted to convert an optical signal incident thereupon into an electrical signal, wherein each of said sensor elements is adapted to perform a compensation so as to substantially eliminate an offset error of said sensor, said compensation being performed in said output electronics, each of said sensor elements is adapted to perform said compensation independently from other sensor elements in said device, and each of said sensor elements comprises two change-over switches adapted to control a connection of two different reference voltages to said sensor element.

* * * * *